United States Patent [19]
Pitchaikani et al.

[11] Patent Number: 5,619,615
[45] Date of Patent: Apr. 8, 1997

[54] METHOD AND APPARATUS FOR IDENTIFYING AN AGENT RUNNING ON A DEVICE IN A COMPUTER NETWORK

[75] Inventors: Balaji Pitchaikani, Santa Clara; Chen-Yea Luo, Sunnyvale, both of Calif.

[73] Assignee: Bay Networks, Inc., Santa Clara, Calif.

[21] Appl. No.: 279,491

[22] Filed: Jul. 22, 1994

[51] Int. Cl.$^6$ .................................................. G06F 15/163
[52] U.S. Cl. .......................................... 395/11; 395/200.01
[58] Field of Search .............................. 395/51, 700, 600, 395/11, 200.01, 200.03, 200.11

[56] References Cited

U.S. PATENT DOCUMENTS

| | | | |
|---|---|---|---|
| 5,226,120 | 7/1993 | Brown et al. | 395/200 |
| 5,367,635 | 11/1994 | Bauer et al. | 395/200 |
| 5,491,796 | 2/1996 | Wanderer et al. | 395/200.09 |

OTHER PUBLICATIONS

Winston, Patrick Henry. "Artificial Intelligence." Third Edition. pp. 25–33 and 423–442.
Waldbusser, Steven L. "Hints on coexistence and transition from SNMP to SNMPv2." The Simple Times. vol. 2. No. 2., p. 5.

*Primary Examiner*—Robert W. Downs
*Attorney, Agent, or Firm*—Blakely, Sokoloff, Taylor & Zafman

[57] ABSTRACT

A method and apparatus for identifying an agent based on a decision tree is provided. The apparatus transmits a series of queries to the agent and the agent transmits responses to the queries back to the apparatus. Based on the responses, the apparatus determines the identity of the agent. The apparatus determines the series of queries by traversing the decision tree based on responses sent by the agent to previous queries. When the traversal arrives at a leaf node of the decision tree, an agent associated with the leaf node is used to identify the agent. If the traversal fails before arriving at a leaf node, then a weight is determined for each supported agent based on the responses sent by the agent, and the agent with the greatest weight is used to identify the agent.

20 Claims, 4 Drawing Sheets

METHOD AND APPARATUS FOR IDENTIFYING AN AGENT RUNNING ON A DEVICE IN A COMPUTER NETWORK

BACKGROUND OF THE INVENTION

A network generally includes a number of devices connected to allow inter-device communication. To monitor the status of any given device on a network, a network management station transmits a message requesting information over the network to an agent running on the given device. In response, the agent sends a message including the requested information over the network to the network management station. The network management station communicates with agents according to a protocol, such as the Simple Network Management Protocol (SNMP).

However, before the network management station can request status information from an agent, the network management station must know the type of information that a given agent is able to provide. Different agents are capable of providing different types of information. To better monitor, debug, and optimize a network, the network management station should be able request all of the information any given agent on the network is capable of supplying.

The type of information a given agent can provide depends on the Management Information Bases (MIBs) it supports. A MIB specifies groups of objects, and each object defines a group of data types. An agent supports a MIB if the agent is capable of supplying the type of information defined in the objects specified in the MIB. Most agents can provide the type information defined in the objects specified in certain standard MIBs, known as MIB I and MIB II. However, even support for these standard MIBs varies from agent to agent. In addition, each agent may support a different version of a MIB, or support proprietary MIBs. Finally, many agents have more than one mode. An agent executing in one mode may support different MIBs than the same agent executing in another mode.

Consequently, for the network management station to have access to all of the information a device can provide, the network management station must first identify the agent running on the device. Once the identity of the agent is known, the network management station can access a MIB database to determine which MIBs the identified agent supports. Once the MIBs supported by the agent at issue have been determined, the network management station can request from the agent the information defined in the objects specified in the supported MIBs.

In light of the foregoing, it is clearly desirable to provide an apparatus and method for identifying an agent running on a device in a network system. Further, it is clearly desirable to determine the MIBs supported by the agent in order for the network management station to access all of the information the agent is able to provide. Finally, it is clearly desirable to provide an agent identifying apparatus and method that is fast and efficient.

Different agents respond to the queries in different ways. Therefore, one way to determine the identity of a given agent is to send the given agent certain selected queries and then compare responses of the given agent to the responses that would be expected from a first selected type of agent. If the actual responses match the expected responses, then the given agent is determined to be the first selected type of agent. If the actual responses do not match the expected responses, then the given agent is determined not be the first selected type of agent.

If the actual agent is not the first selected type of agent, then a second set of selected queries are sent to the agent, and the responses to the second set of selected queries are compared to the responses that would be expected from a second selected type of agent. If the actual responses match the expected responses, then the given agent is the second selected type of agent. If the actual responses do not match the expected responses, then this agent by agent response comparison process is repeated until the given agent is positively identified.

One obvious problem with the agent by agent identification process described above is that it is slow and inefficient. On average, this identification process requires x/2 query-response-comparison operations, where x is the number of known agents. The performance of these operations may result in unacceptable delays. For every two new agents developed, the number of query-response-comparison operations required to identify an average agent increases by one. Further, each query and each response is sent over the network. Therefore, the greater the number of query-response-comparison operations required for each identification process, the greater the amount of network traffic generated by the identification process.

A second problem with the agent-by-agent identification process is that a given implementation of the agent-by-agent identification method will not identify agents and agent versions which are developed after the given implementation. Specifically, responses from a newly developed agent will typically not match the responses expected from any previously known agent. Therefore, an attempt to match the responses from a new agent to responses expected from each of the previously known agents will fail. Further, the identification failure only occurs after time and network resources have been expended in performing a query-response-comparison operation for each previously known agent. Once an attempt to identify a newly developed agent has failed, the network management system may return an error message, or may request information from the unidentified agent under an assumption that the new agent supports a standard MIB (MIB I or MIB II).

In light of the foregoing, an agent identification mechanism that is easily updated to identify newly developed agents is desirable. Further, an agent identification mechanism whose efficiency is not substantially affected by the addition of support for new agents is clearly desirable. Finally, an agent identification mechanism which, upon encountering a new, unsupported agent, is able to identify a known agent with similar capabilities to the unsupported agent, is clearly desirable.

SUMMARY AND OBJECTS OF THE INVENTION

According to one aspect of the present invention, a method for identifying an agent running on a device in a network system is provided. According to the method, a plurality of agents is established as a set of possible agents. A current query is transmitted over the network to the agent and a current response is received over the network from the agent. A set of likely agents is determined based on the current response. The set of likely agents is a subset of the set of possible agents.

If the set of likely agents includes more than one agent, then a new query is selected based upon the current response, the new query is established as the current query, and the set of likely agents is established as the possible set of agents. The above-described steps are repeated until the set of likely agents includes less than two agents. If the set of likely agents includes a single agent, then the single agent is selected to identify the agent.

According to another aspect of the present invention, a method for identifying an agent running on a device in a network is provided. The method generally comprises the steps of constructing a decision tree and identifying the agent based upon the decision tree.

To construct the decision tree, a plurality of nodes are provided. The plurality of nodes includes a root node and a plurality of leaf nodes. An agent is associated with each node of the plurality of nodes. A query is associated with each node of the plurality of nodes except the plurality of leaf nodes. A plurality of branches is also provided. Each branch of the plurality of branches originates in an originating node of the plurality of nodes and terminates in a terminating node of the plurality of nodes. A response group is established for each branch of the plurality of branches. The response group for a given branch of the plurality of branches includes at least one possible response to the query associated with the originating node.

To identify the agent based upon the decision tree, the root node is initially established as a current node. The current node is the originating node for a plurality of current branches. The query associated with the current node is established as a current query. The current query is transmitted to the agent over the network. A current response is received to the current query from the agent over the network. The current response is compared to the response groups associated with the current branches.

If the current response belongs to a given response group associated with a given current branch and the terminating node of the given current branch is a leaf node, then the agent associated with the terminating node is selected to identify the agent. Otherwise, if the current response belongs to a given response group associated with a given current branch and the terminating node of the given current branch is not a leaf node, then the terminating node is established as the current node and the above-described steps are repeated.

According to yet another aspect of the present invention, an apparatus for identifying an agent running on a device in a network is provided. The apparatus includes a network access unit, a storage unit and a processor.

The network access unit is connected to the device over the network. The storage unit stores a plurality of instructions, a decision tree and a database. The database includes data indicative of a plurality of agents. The processor is coupled to the network access unit and the storage unit. The processor is configured to read and execute the plurality of instructions from the storage unit.

The plurality of instructions include instructions for establishing a root node of the decision tree as a current node and causing the network access unit to transmit a current query over the network to the agent. The current query is a query associated with the current node. The plurality of instructions further include instructions for receiving a current response over the network from the agent through the network access unit and comparing the current response to a plurality of current response groups to determine a matching branch.

Each current response group of the plurality of current response groups is a response group associated with a branch originating at the current node. The matching branch is a branch associated with a current response group which matches the current response. The matching branch has a terminating node.

The plurality of instructions further includes instructions for identifying the agent associated with the terminating node if the terminating node is a leaf node. If the terminating node is not a leaf node, then the terminating node is established as the current node and the processor repeats execution of the instructions described above.

BRIEF DESCRIPTION OF THE DRAWINGS

The invention may best be understood by referring to the following description and accompanying drawings which illustrate the invention. In the drawings.

DETAILED DESCRIPTION OF THE PREFERRED EMBODIMENT

Figure 1:
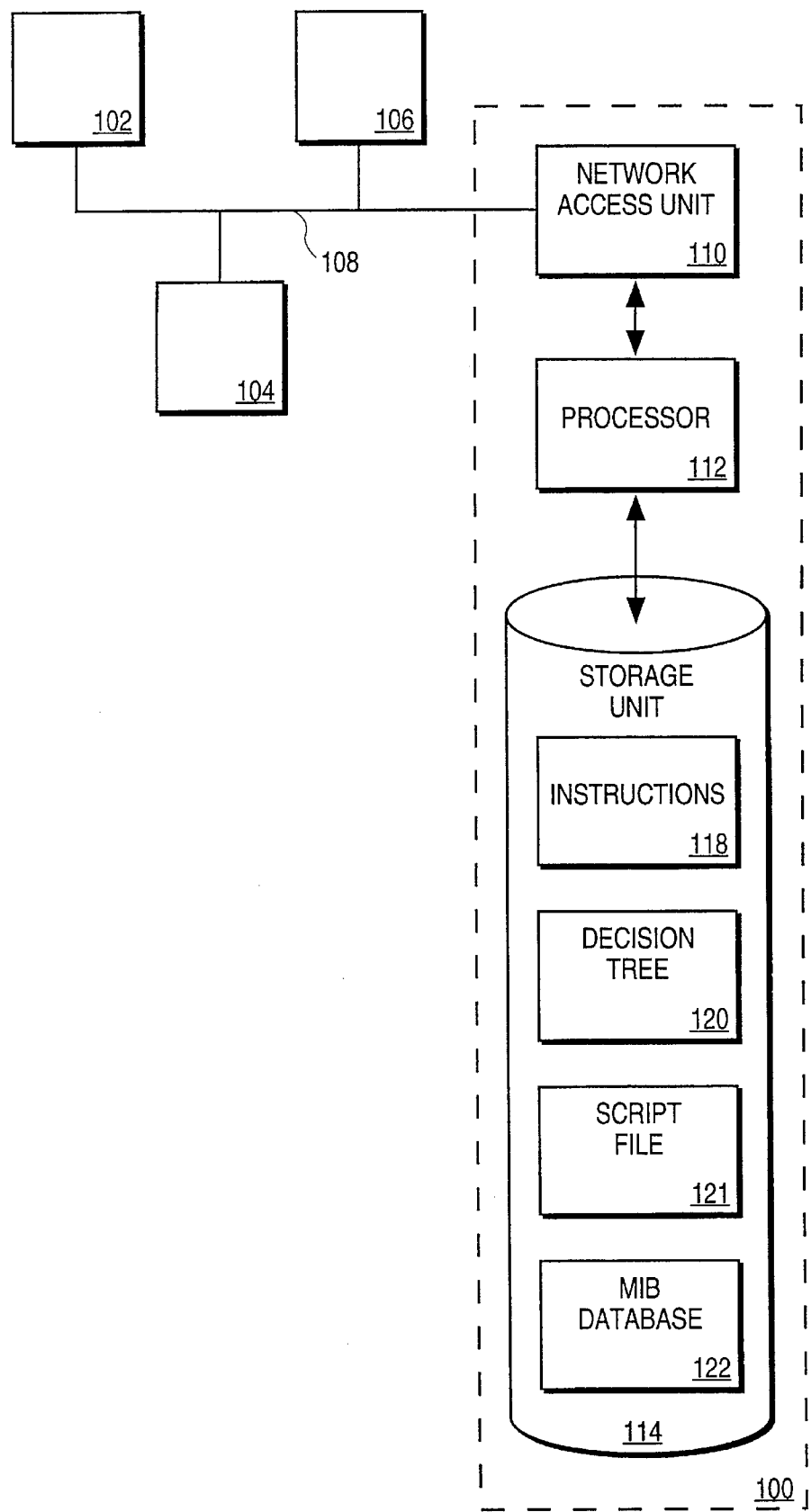
FIG. 1 is a block diagram illustrating a network including a network management station according to one embodiment of the present invention.

Referring now to FIG. 1, it illustrates in block diagram from a network management station 100 according to one embodiment of the invention. Network management station 100 is connected to a plurality of devices 102, 104 and 106 over a network connector 108. Network management station 100 generally includes a network access unit 110, a processor 112, and a storage unit 114.

Network access unit 110 is connected to the network connector 108 and to processor 112. Network access unit 110 transmits information requests to agents running on devices 102, 104 and 106 over network connector 108 in response to commands from processor 112. Network access unit 110 also receives responses from the agents to the information requests. The responses are sent over the network connector 108 by the responding agent.

Storage unit 114 represents one or more devices for storing information. For example, storage unit 114 may include a disk drive and a random access memory. The specific devices used by network management station 100 to store information will vary based on each specific implementation. Storage unit 114 stores a plurality of instructions 118, a decision tree 120, an agent hierarchy script file 121, and a MIB database 122.

Agent hierarchy script file 121 is a human-readable text file from which processor 112 constructs decision tree 120 and updates MIB database 122. Because agent hierarchy script file 121 is a text file, it may be updated using a variety of text editors. As will be explained in greater detail below, agent hierarchy script file 121 provides a mechanism to update the decision tree 120 and the MIB database to support previously unsupported agents.

MIB database 122 is a database containing data indicative of a plurality of agents and a plurality of MIBs. Preferably, MIB database 122 is a database constructed and maintained as described in U.S. patent application Ser. No. 08/279,494, entitled "MIB Database and Generic Popup Window Architecture," filed on equal day herewith the contents of which are incorporated herein by reference. Each agent contained in MIB database 122 comprises data indicative of a specific type of agent. Each agent is linked to the MIBs supported by the agent. For agents with multiple modes, MIB database 122 has a "virtual" agent for each mode. MIB database 122 also has virtual agents to represent hypothetical agents which support predetermined sets of MIBs.

Decision tree 120 includes data representing a plurality of nodes and a plurality of branches. The plurality of nodes in decision tree 120 includes a plurality of leaf nodes. As will be explained hereafter, a leaf node is a node that has no originating branches. Each node of decision tree 120 is associated with an agent of MIB database 122. Each node other than the plurality of leaf nodes is also associated with a query. Each branch of decision tree 120 originates in a node, terminates in a node and is associated with a response group. A response group is a group containing one or more possible responses to a query. The specific structure of decision tree 120, and how decision tree 120 is constructed based on agent hierarchy script file 121, will be discussed in greater detail below.

Processor 112 is configured to retrieve and execute instructions 118 from storage unit 114 to identify a selected agent. Specifically, the execution of instructions 118 causes processor 112 to instruct network access unit 110 to send queries to the selected agent according to decision tree 120. The selected agent sends responses to the queries to network access unit 110. Based on the responses to the queries, processor 112 selects an agent stored in MIB database 122 to identify the selected agent according to decision tree 120.

Once the selected agent is determined, network management station 100 preferably constructs a cache table representing the device-to-agent relationships. Thus, processor 112 need only access the cache table to identify a given agent once the identity of the given agent has been initially determined.

Figure 2:
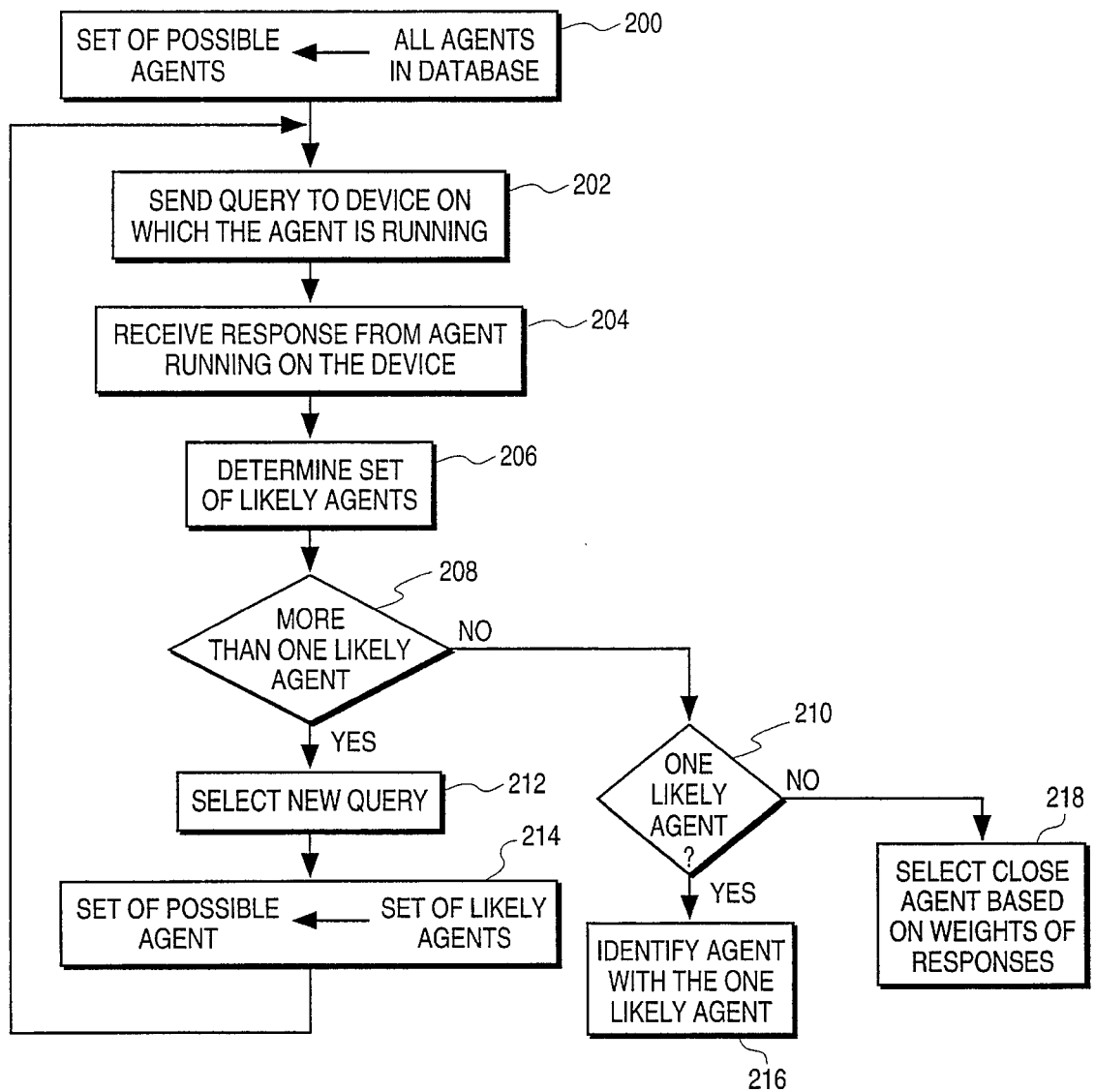
FIG. 2 is a flow chart of a method for identifying an agent according to one aspect of the invention.
Figure 3:
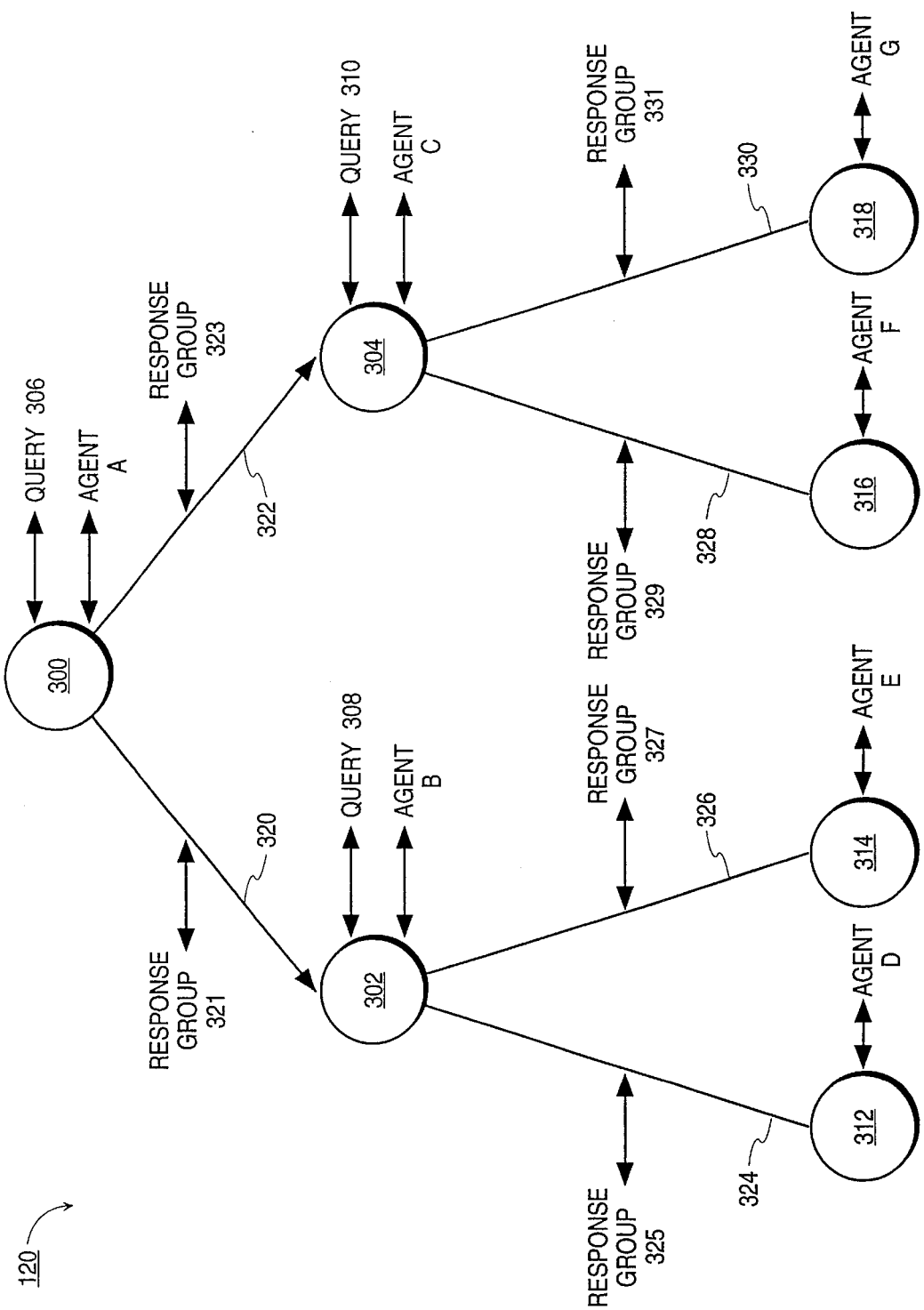
FIG. 3 is a schematic diagram of a decision tree for identifying an agent on a network.

The method by which network management station 100 identifies the selected agent shall now be described in greater detail with reference to FIGS. 2 and 3. FIG. 2 illustrates a flow chart of a method for identifying an agent running in a network system according to one embodiment of the invention. FIG. 3 illustrates decision tree 120 according to one embodiment of the invention.

Turning first to FIG. 3, decision tree 120 includes a plurality of nodes 300, 302 and 304. Each node of nodes 300, 302 and 304 is associated with a query. Specifically, node 300, which is the root node, is associated with a query 306, node 302 is associated with a query 308, and node 304 is associated with a query 310. Each node of nodes 300, 302 and 304 is also associated with an agent of MIB database 122. Specifically, node 300 is associated with an agent A, node 302 is associated with an agent B, and node 304 is associated with an agent C.

Decision tree 120 includes a plurality of leaf nodes 312, 314, 316 and 318. Each leaf node of leaf nodes 312, 314, 316 and 318 is associated with an agent. Specifically, leaf node 312 is associated with an agent D, leaf node 314 is associated with an agent E, leaf node 316 is associated with an agent F and leaf node 318 is associated with agent G.

Finally, decision tree 120 includes a plurality of branches 320, 322, 324, 326, 328 and 330. Each of branches 320, 322, 324, 326, 328 and 330 originates in a node, terminates in a node, and is associated with a response group. Specifically, branch 320 originates in node 300, terminates in node 302, and is associated with a response group 321. Branch 322 originates in node 300, terminates in node 304, and is associated with a response group 323. Branch 324 originates in node 302, terminates in leaf node 312 and is associated with a response group 325. Branch 326 originates in node 302, terminates in leaf node 314 and is associated with a response group 327. Branch 328 originates in node 304, terminates in leaf node 316 and is associated with a response group 329. Branch 330 originates in node 304, terminates in leaf node 318 and is associated with a response group 331.

The response group associated with a given branch consists of possible responses to the query associated with the node in which the given branch originates. For example, branch 322 originates at node 300 and terminates at node 304. Query 306 is associated with node 300. Therefore, response group 323 consists of possible responses to query 306. Similarly, response group 327 consists of possible responses to query 308.

Referring again to FIG. 2, the process by which processor 112 identifies a specified agent according to decision tree 120 shall now be described. At step 200, processor 112 establishes a set of possible agents ("PA-SET"). The PA-SET is a set comprising all of the agents in MIB database 122 which could possibly identify the specified agent. Initially, the identity of the specified agent is entirely unknown. Therefore, the PA-SET initially includes all possible agents in MIB database 122.

Processor 112 establishes the PA-SET by establishing a node of decision tree 120 as a current node. The agent associated with the current node, as well as the agents associated with all nodes below the current node, are considered to be in the PA-SET. Initially, processor 112 establishes the root node, node 300, as the current node. Since all of the agents in MIB database 122 are associated with either node 300 or a node below node 300, all of the agents in MIB database 122 initially belong to the PA-SET.

At step 202, the processor 112 causes network access unit 110 to transmit a query over the network connector 108 to the device running the specified agent. The query is the query associated with the current node of decision tree 120. Initially, the current node is node 300. Therefore, processor 112 initially causes network access unit 110 to transmit query 306 to the specified agent. At step 204, processor 112 receives, through network access unit 110, the response of the specified agent to query 306 over network connector 108. At step 206, processor 112 determines a set of likely agents ("LA-SET") based on the current response. The LA-SET is a subset of the PA-SET.

To determine the LA-SET, processor 112 determines if the actual response of the specified agent belongs to any of the response groups associated with the branches originating from the current node. In the present example, the current node is node 300. The branches which originate from node 300 are branches 320 and 322. Therefore, it is determined whether the actual response belongs to either response group 321 or response group 323. If the actual response belongs to a response group associated with a given branch, then the given branch is referred to as the matching branch. For example, if the actual response belongs to response group 323, then branch 322 is the matching branch. The LA-SET consists of the agents associated with all nodes and leaves below the matching branch. For example, if the actual response to query 306 belongs to response group 321, then the LA-SET includes the agents associated with nodes 302, 312 and 314. More specifically, the LA-SET would include agent B, agent D and agent E. Similarly, if the actual response to query 306 belongs to response group 323, then the LA-SET includes the agents associated with nodes 304, 316 and 318. More specifically, the LA-SET would include agent C, agent F and agent G. If the actual response does not belong to any response group associated with the branches originating in the current node, then the LA-SET is empty (i.e. includes no agents).

At step 208, processor 112 determines whether the LA-SET contains more than one agent. If the LA-SET does not contain more than one agent, then control passes to step 210. If the LA-SET does contain more than one agent, then control passes to step 212. For this example, it shall be assumed that the actual response to query 306 belonged to response group 321. Therefore, branch 320 is the matching branch and the LA-SET includes agents B, D and E. Since the LA-SET includes three agents, control passes to step 212.

At step 212, processor 112 selects a new query based upon the most recently-received response. At step 214, processor 112 establishes the LA-SET as the PA-SET. Steps 212 and 214 are performed by causing processor 112 to establish the node in which the matching branch terminates as the current node. In the present example, the matching branch is branch 320, and branch 320 terminates in node 302. Therefore, processor 112 establishes node 302 as the current node. Since the query associated with the new current node is considered to be the current query, query 308 becomes the new current query. As described above, the agent associated with the current node, as well as the agents associated with all nodes and leaves below the current node, are considered to be in the PA-SET. Since the current node is now node 302, the new PA-SET includes only agents B, D and E. As described above, agents B, D and E comprised the initial LA-SET. Therefore, establishing the terminating node of the matching branch as the current node is equivalent to setting the PA-SET equal to the previous LA-SET.

Once node 302 has been established as the current node, control returns to step 202. At step 202, processor 112 causes network access unit 110 to transmit query 308, the current query, over the network connector 108 to the specified agent. At step 204, processor 112 receives, through network access unit 110, the response of the specified agent to query 308 over network connector 108. At step 206, processor 112 determines a LA-SET based on the current response.

To determine the new LA-SET, processor 112 determines if the actual response of the specified agent belongs to a response group associated with the branches originating from node 302, the current node. The branches which originate from node 302 are branches 324 and 326. Therefore, it is determined whether the actual response belongs to either response group 325 or response group 327. If the actual response to query 308 belongs to response group 325, then branch 324 is the matching branch and the LA-SET includes the agent associated with leaf node 312 (agent D). If the actual response to query 308 belongs to response group 327, then the branch 326 is the matching branch and LA-SET includes the agent associated with leaf node 314 (agent E). If the actual response does not belong to any of the response groups associated with the branches originating in the current node, then the LA-SET is empty.

At step 208, processor 112 determines whether the LA-SET contains more than one agent. As mentioned above, if the actual response to query 308 belongs to response group 325, then the LA-SET consists of agent D. If the actual response to query 308 belongs to response group 327, then the LA-SET consists of agent E. If the actual response to query 308 belongs to neither response group 327 nor response group 325, then the LA-SET is empty. Therefore, in the present example, the LA-SET will contain at most one agent, and control will pass to step 210.

At step 210, processor 112 determines if the LA-SET includes a single agent. If the LA-SET does include a single agent, then control passes to step 216. If the LA-SET does not include a single agent (i.e. if it is empty), then control passes to step 218. For the present example, it will be assumed that the actual response to query 308 belongs to response group 327. Therefore, control passes to step 216. At step 216, processor 112 generates agent E to identify the specified agent.

If, after any query, the actual response from the specified agent does not belong to a response group, then control will pass to step 218. This occurs if and only if the specified agent is not represented in MIB database 122. For example, the specified agent may be an agent released after the last update to MIB database 122. The specified agent, and therefore the supported MIBs of the specified agent, cannot be exactly identified under these circumstances. Therefore, it will probably not be possible to access all of the information that the specified agent is capable of supplying. However, under these circumstances, it is desirable to determine, as close as possible, the capabilities of the specified agent.

To make this determination, processor 112 selects a substitute agent in MIB database 122 with capabilities most similar to the specified agent. This is accomplished in step 218 by determining a weight for each agent in the MIB database 122. The weight of a given agent is based on how close the actual responses of the specified agent are to those which would have been generated by the given agent. For example, one of the queries may ask how many objects the specified agent supports. The specified agent may answer 100. If none of the agents represented in the MIB database would have answered 100, then the specified agent is not specifically supported. However, the MIB database may contain agents which support 10, 50, 80 and 200 objects. The agent which supports 10 objects may be assigned the weight 0.1, the agent which supports 50 objects may be assigned the weight 0.5 and the agent which supports 80 objects may be assigned the weight 0.8. The agent which supports 200 would be assigned the weight 0.0, since the specified agent would not be able to support all of its features. The agent selected by processor 112 to identify the specified agent is the agent with the largest weight. In the example above, the agent which supports 80 objects would be selected as the substitute agent.

For the purposes of explanation, a relatively simple decision tree structure has been discussed. However, the actual decision tree structure may be much more complex. For example, each node in the example had, at most, two branches originating therefrom. However, each node may have any number of branches. The response groups for each of the branches are compared to the actual response to determine a matching branch. In addition, all of the actual responses, not just one, will factor into the weight given to each agent when determining a substitute agent for a specified agent which is not supported.

Further, each query may include requests for more than one piece of information. For example, in the preferred embodiment, the query associated with the root node is a request for data indicative of the type of device on which the specified agent is running. The specified agent may respond, for example, with an indication that the specified agent is running on a SynOptics concentrator. The second query in the preferred embodiment requests data indicative of a general agent, a major software version, and a minor software version. The specified agent may respond, for example, with an indication that the general agent is Ethernet version is 331XS, the major software version is 5 and the minor software version is 1. This process continues until the specified agent is positively identified, or until the specified agent responds with a response that does not belong to any response group. If the specified agent responds with a response that does not belong to any response group, then a substitute agent is chosen based on the specified agent's responses, as described above.

By the process described above, processor 112 identifies an agent based on a series of tests. Each test consists of sending a query to the agent, receiving a response from the agent, and comparing the response with possible responses. After each test, processor 112 limits consideration to only those agents which would have produced the responses which were actually produced by the specified agent. Through this process, processor 112 quickly identifies a single agent which either specifically identifies the specified agent, or is the closest known functional match to the specified agent.

Preferably, a network management station identifies all of the agents running on the network by the above-described process at start-up. The network management station may then store the identity of each of the agents for ready access. Therefore, a user need not wait for the network management station to perform the agent identification process at the time that the user requests the identity of a given agent. However, since the identity of agents on the network may change after start-up, the network management station preferably periodically polls the devices on the network to detect any changes. Changes may also be detected based on trap messages received by the network management station. Upon detecting a change, the network management station performs the agent identification process on the changed agent, and updates the stored agent identification data based on the results of the agent identification process.

As discussed above, processor 112 selects an agent closest to the specified agent when the specified agent is not specifically supported. However, this process is only second best when compared to specifically supporting the specified agent. Therefore, the preferred embodiment of the invention provides a mechanism for updating the decision tree 120 and the MIB database 122 to support newly released agents.

As mentioned above, in the preferred embodiment, the decision tree 120 is generated, and MIB database 122 is updated, based on agent hierarchy script file 121. Further, agent hierarchy script file 121 is stored separately from instructions 118. Therefore, the MIB database 122 and the decision tree 120 may be updated without having to release a whole new version of instructions 118.

Agent hierarchy script file 121 describes agents, the relationship between agents, and inference rules to distinguish one agent from another. Each entry in the agent hierarchy script file 121 represents an agent, and has the form:

---

[Agent_Name:Agent_Version]
 -Agent_Description
 % Parent_Agent_Name:Parent_Agent_Version
MIB_Object_Name(Matching_MIB_Value),. . .
 Module_Name:Module_Version
 Module_Name:Module_Version
 . . .
 . . .
;

---

Agent_Name:Agent_Version indicates the agent represented by a given entry (the "present agent"). Processor 112 builds a corresponding node in decision tree 120 for each entry contained in hierarchy script file 121, and associates the agent represented by the entry with the corresponding node. The node associated with the present agent shall be referred to as the present node.

Agent_Description is a description of the present agent. Parent_Agent_Name:Parent_Agent_Version indicates a parent agent. A parent agent is the agent associated with the node directly above the present node. Processor 112 identifies the node in decision tree 120 which is associated with the parent agent (the "parent node"), and constructs a branch running down from the parent node to the present node. For example, in FIG. 3, the parent agent of agent B is agent A, and processor 112 has constructed branch 320 from node 300 down to node 302.

MIB_Object_Name indicates information to be requested in a query. As mentioned above, each query may request more than one type of information. Therefore, any given entry may specify more than one MIB_Object_Name. Processor 112 constructs a query requesting the information specified in all of the MIB_Object_Names of the present entry, and associates the constructed query with the parent node.

Each Matching_MIB_Value is associated with a preceding MIB_Object_Name. Each Matching_MIB_Value indicates values which an agent may return in response to the request specified by the associated MIB_Object_Name. Specifically, each Matching_MIB_Value contains a set of one or more values, at least one of which an agent would send in response to the associated MIB_Object_Name if the agent was of the present agent. The response group associated with the branch between the parent node and the present node is constructed based upon the Matching_MIB_Values.

Module_Name:Module_Version is the name and version number of a MIB supported by the present agent. An agent may support more than one MIB, so each entry may contain more than one Module_Name:Module_Version.

An entry for a hypothetical agent X, version 4.2, is shown below:

---

[AgentX:4.2]
 • Agent X version 4.2
 % AgentW:5.5 ASK1(ans1 ans2 ans4), ASK2(ansX ansY),
 ASK3(ansV),
 X-MIB:1.0;
 X-MIB:1.1
 Y-MIB:2.0
;

---

Figure 4:
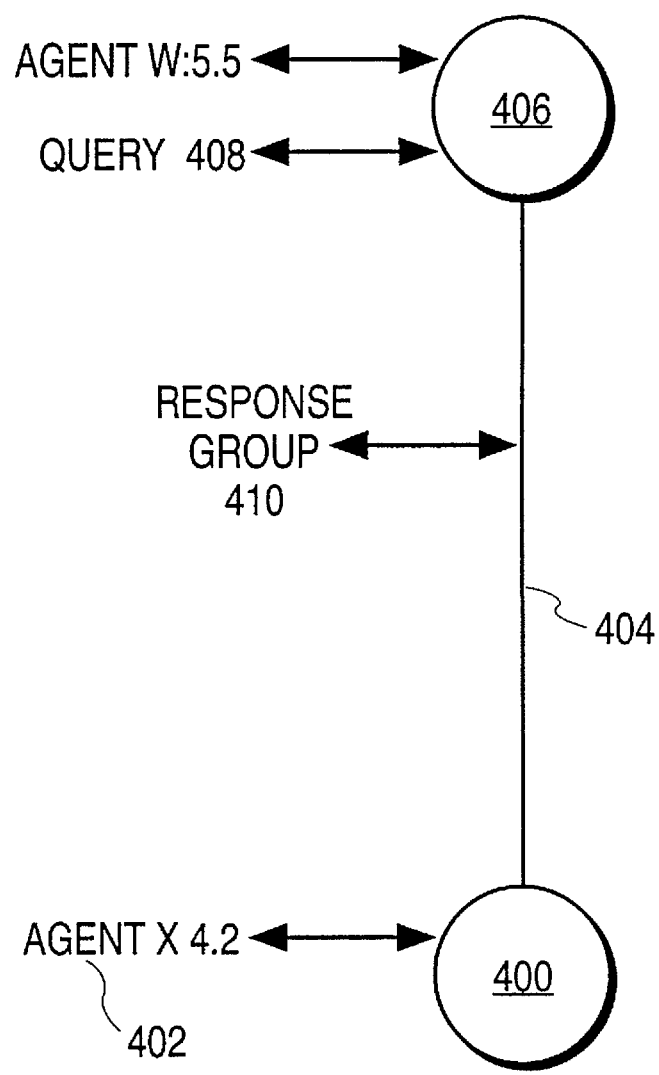
FIG. 4 is a schematic diagram illustrating a portion of a decision tree.

In response to this entry, processor 112 would build a portion of decision tree 120, as shown in FIG. 4, and update MIB database 122. Specifically, processor 112 would create a node 400, and associate the node 400 with agent X:4.2, as shown at 402. Processor 112 would also determine if data indicative of agent X:4.2 is present in MIB database 122. If data indicative of agent X:4.2 is not present in MIB database 122, then processor 112 will update MIB database 122 to include data indicative of agent X:4.2, and link the agent data to data indicative of the MIBs specified in the entry (i.e. X-MIB:1.0, X-MIB:1.1, and Y-MIB:2.0). Processor 112 would then construct a branch 404 from node 400 up to a node 406 associated with agent W:5.5. The entry for a parent agent always precedes the entry for a child agent in agent hierarchy script file 121. Therefore, node 406 was previously constructed based on a prior entry of script file 121. Preferably, the root node for the decision tree 120 will be created first, and the entries which identify a child of the root node identify the root node as the parent node by specifying a predetermined symbol, such as an asterisk, as the Parent_Agent_Name.

Processor 112 then constructs a query 408 and associates the query 408 with node 406, the parent node of node 400. The query 408 would include a request for three types of information: ASK1, ASK2 and ASK3. Processor 112 then constructs a response group 410 and associate the response group 410 with branch 404. The response group 410 includes possible values for each type of information requested in query 408. Specifically, response group 410 includes responses ans1, ans2 and ans4, which are possible values for ASK1, responses ansX and ansY, which are possible values for ASK2, and ansV, which is a possible value for ASK3.

When node 406 is the current node in an agent identification process, processor 112 will send query 408 to the specified agent. The specified agent will respond with a first value corresponding to ASK1, a second value corresponding to ASK2, and a third value corresponding to Ask3. If the first value is either ans1, ans2 or ans4, the second value is either ansX or ansY, and the third value is ansV, then branch 404 is considered the matching branch, and node 400 will be the next current node. If node 400 has no children (i.e. is a leaf node), then the specified agent will be identified as Agent X 4.2. Processor 112 will then access MIB database 122 to determine the MIBs supported by agent X:4.2.

While specific embodiments of the present invention have been described, various modifications and substitutions will, by this disclosure, no-doubt become apparent to one skilled in the art. Such modifications and substitutions are within the scope of the present invention, and are intended to be covered by the following claims.

What is claimed is:

1. A method for identifying an agent running on a device in a network system, the method comprising the steps of:
    a) a network management station (NMS) establishing a plurality of agents as a set of possible agents;
    b) said NMS transmitting a current query over said network to said agent, said current query requesting information regarding one or more characteristics of said agent;
    c) said NMS receiving a current response over said network from said agent;
    d) determining a set of likely agents based on said current response, said set of likely agents being a subset of said set of possible agents;
    e) if said set of likely agents includes more than one agent, then said NMS:
        i) selecting a new query based upon said current response,
        ii) establishing said new query as said current query,
        iii) establishing said set of likely agents as said possible set of agents,
        iv) repeating steps (b) through (e) until said set of likely agents includes less than two agents; and
    f) if said set of likely agents includes a single agent, then said NMS selecting said single agent to identify said agent.

2. The method of claim 1 further including the step of, if said set of likely agents includes no agents, then selecting a substitute agent of said plurality of agents to identify said agent, said substitute agent being selected based upon each said current response received from said agent.

3. The method of claim 2 wherein said step of selecting said substitute agent includes the steps of:

determining a weight for each agent of said plurality of agents, said weight of a given agent being based upon a comparison between a plurality of capabilities supported by said agent and a plurality of capabilities supported by said given agent; and
   selecting an agent with a largest weight as said substitute agent.

4. The method of claim 1 wherein said step of establishing said plurality of agents as said set of possible agents comprises a step of establishing a root node of a decision tree as a current node, said decision tree including a plurality of nodes connected by a plurality of branches, each node of said plurality of nodes being associated with an agent, said set of possible agents consisting of an agent associated with said current node and the agents associated with all nodes on said decision tree below said current node.

5. The method of claim 4 wherein said step of determining said set of likely agents based on said current response includes the step of determining a matching branch based on said current response, said matching branch connecting said current node to a child node, said set of likely agents consisting of an agent associated with said child node and the agents associated with all nodes below said child node in said decision tree.

6. The method of claim 5 wherein each branch in said decision tree is associated with a response group, said step of determining a matching branch originating at said current node based on said current response including the steps of determining a response group which includes response values which match said current response, and selecting the branch associated with said response group as said matching branch.

7. The method of claim 4 further comprising the step of constructing said decision tree based on a script file.

8. The method of claim 7 wherein said script file contains human-readable entries.

9. The method of claim 8 wherein each entry includes data indicative of a specified agent and data indicative of a parent agent, said step of constructing said decision tree based on said script file including the steps of creating a new node, associating said new node with said specified agent, and linking said new node to a parent node associated with said parent agent with a new branch.

10. The method of claim 9 wherein each entry further includes data indicative of a response group, said step of constructing said decision tree based on said script file further including the step of associating said response group with said new branch.

11. The method of claim 1 wherein at least one of said plurality of agents is a virtual agent, said virtual agent representing a hypothetical agent capable of supplying predetermined types of information.

12. A method for identifying an agent running on a device in a network, the method comprising the steps of:
    A. constructing a decision tree by performing the steps of
        (1) reading a script file;
        (2) providing a plurality of nodes, said plurality of nodes including a root node and a plurality of leaf nodes;
        (3) associating an agent to each node of said plurality of nodes;
        (4) associating a query with each node of said plurality of nodes except said plurality of leaf nodes;
        (5) providing a plurality of branches, each branch of said plurality of branches originating in an originating node of said plurality of nodes and terminating in a terminating node of said plurality of nodes;

(6) establishing a response group for each branch of said plurality of branches, said response group for a given branch of said plurality of branches including at least one possible response to said query associated with said originating node;

B. identifying said agent based upon said decision tree by performing the steps of
  (1) establishing said root node as a current node, said current node being said originating node for a plurality of current branches;
  (2) establishing said query associated with said current node as a current query;
  (3) transmitting said current query to said agent over said network;
  (4) receiving said a current response to said current query from said agent over said network;
  (5) comparing said current response to said response groups associated with said current branches;
    (a) if said current response belongs to a given response group associated with a given current branch and said terminating node of said given current branch is a leaf node, then selecting said agent associated with said terminating node to identify said agent; and
    (b) if said current response belongs to a given response group associated with a given current branch and said terminating node of said given current branch is not a leaf node, then establishing said terminating node as said current node and repeating steps (B)(2) to (B)(5).

13. An apparatus for identifying an agent running on a device in a network, the apparatus comprising:

a network access unit connected to the device over the network;

a storage unit for storing a plurality of instructions, for storing a decision tree and for storing a database, said database including data indicative of a plurality of agents; and a processor coupled to the network access unit and the storage unit, the processor being configured to read and execute said plurality of instructions from said storage unit;

said plurality of instructions including instructions for:
  a) establishing a root node of said decision tree as a current node;
  b) causing said network access unit to transmit a current query over said network to said agent, said current query being a query associated with said current node, said current query requesting information regarding one or more characteristics of said agent;
  c) receiving a current response over said network from said agent through said network access unit;
  d) comparing said current response to a plurality of current response groups to determine a matching branch, each current response group of said plurality of current response groups being a response group associated with a branch originating at said current node, said matching branch being a branch associated with a current response group which matches said current response, said matching branch having a terminating node;
  e) identifying said agent associated with said terminating node if said terminating node is a leaf node; and
  f) establishing said terminating node as said current node and repeating steps (a) to (e) if said terminating node is not a leaf node.

14. The apparatus of claim 13 wherein said plurality of instructions further includes instructions for selecting a substitute agent of said plurality of agents to identify said agent if said current response does not belong to any said current response groups.

15. The apparatus of claim 14 wherein said each current response sent by said agent indicates capabilities of said agent, said instructions for selecting said substitute agent of said plurality of agents to identify said agent including instructions for:

determining a weight for each agent of said plurality of agents, said weight of a given agent being based upon a comparison between said capabilities of said agent and capabilities supported by said given agent; and selecting an agent with a largest weight as said substitute agent.

16. The apparatus of claim 13 wherein said storage unit is configured to store a script file, said plurality of instructions further comprising instructions for constructing said decision tree based on said script file.

17. The apparatus of claim 16 wherein said script file contains human readable entries.

18. The apparatus of claim 17 wherein each entry of said script file includes data indicative of a specified agent and data indicative of a parent agent, said instructions for constructing said decision tree based on said script file including instructions for creating a new node, associating said new node with said specified agent, and linking said new node to a parent node associated with said parent agent with a new branch.

19. The apparatus of claim 18 wherein each entry further includes data indicative of a response group, said instructions for constructing said decision tree based on said script file further including instructions for associating said response group with said new branch.

20. The apparatus of claim 13 wherein at least one of said plurality of agents is a virtual agent, said virtual agent representing a hypothetical agent capable of supplying predetermined types of information.

* * * * *